(12) United States Patent
Gu et al.

(10) Patent No.: US 9,280,890 B2
(45) Date of Patent: Mar. 8, 2016

(54) SECURITY SYSTEM ACCESS DETECTION

(71) Applicant: MivaLife Mobile Technology, Inc., George Town, KY (US)

(72) Inventors: Keqin Gu, Fremont, CA (US); Yan Qi, Fremont, CA (US); Kuochun Lee, Fremont, CA (US); Shicong Wang, Emeryville, CA (US)

(73) Assignee: MivaLife Mobile Technology, Inc., George Town (KY)

( * ) Notice: Subject to any disclaimer, the term of this patent is extended or adjusted under 35 U.S.C. 154(b) by 94 days.

(21) Appl. No.: 14/228,849

(22) Filed: Mar. 28, 2014

(65) Prior Publication Data

US 2015/0279198 A1 Oct. 1, 2015

(51) Int. Cl.
*G05B 19/00* (2006.01)
*G08B 25/08* (2006.01)
*G08B 13/196* (2006.01)
*G08B 25/14* (2006.01)
*H04L 29/08* (2006.01)
*H04L 12/28* (2006.01)
*H04L 29/06* (2006.01)
*H04W 12/08* (2009.01)

(52) U.S. Cl.
CPC .......... *G08B 25/08* (2013.01); *G08B 13/19656* (2013.01); *G08B 25/14* (2013.01); *H04L 12/2818* (2013.01); *H04L 12/2856* (2013.01); *H04L 63/10* (2013.01); *H04L 67/025* (2013.01); *H04L 67/125* (2013.01); *H04L 67/18* (2013.01); *H04L 67/306* (2013.01); *H04W 12/08* (2013.01); *G08B 13/19684* (2013.01)

(58) Field of Classification Search
CPC .......... G07C 9/00103; G07C 9/00111; G08B 27/003
USPC .................... 340/5.21, 5.2, 5.3, 5.82; 455/457
See application file for complete search history.

(56) References Cited

U.S. PATENT DOCUMENTS 8,144,836 B2 * 3/2012 Naidoo ............ G08B 13/19669
379/37
2006/0274695 A1 11/2006 Lavian
(Continued)

FOREIGN PATENT DOCUMENTS

EP 2 892 244 6/2014
WO 2014/034853 3/2014

OTHER PUBLICATIONS

Communication Pursuant to Article 94(3) received in European Patent Application No. 14 180 190.2, filed Aug. 7, 2014. Received Oct. 8, 2015. 6 pages.

(Continued)

*Primary Examiner* — Tai T Nguyen
(74) *Attorney, Agent, or Firm* — Fish & Richardson P.C.

(57) ABSTRACT

Methods, systems, and apparatus, including computer programs encoded on a computer storage medium, for access and control of networked devices. In one aspect, a method includes receiving a request for access to a security system device; determining whether the device is set to a first mode or a second mode; and in response to determining that the device is in the second mode, generating one or more notifications to authorized users identifying the access to the security device.

20 Claims, 4 Drawing Sheets

(56) References Cited

U.S. PATENT DOCUMENTS

| | | |
|---|---|---|
| 2008/0091791 A1 | 4/2008 | Cardarelli |
| 2009/0066788 A1* | 3/2009 | Baum ............... G06F 17/30017 348/143 |
| 2009/0070477 A1 | 3/2009 | Baum et al. |
| 2010/0180335 A1* | 7/2010 | Smithson ................ G06F 21/31 726/18 |
| 2013/0342688 A1* | 12/2013 | Siu .......................... H04L 12/10 348/143 |
| 2014/0157006 A1* | 6/2014 | Kim .................... G06F 12/1433 713/193 |

OTHER PUBLICATIONS

European Search Report received in European Patent Application No. 14 180 190.2, filed Aug. 7, 2014. Received Sep. 15, 2015. 3 pages.

* cited by examiner

SECURITY SYSTEM ACCESS DETECTION

BACKGROUND

This specification relates to access and control of networked devices.

Conventional security systems can include one or more security cameras and/or one or more sensors positioned at different points of a security system location, e.g., a home or office. Some conventional home security systems use a public switched telephone network (PSTN) to transmit alerts to an authorized call service provider using dual-tone multi frequency (DTMF) signaling. A live operator at the call service provider services incoming alarms, e.g., by calling the police. Additionally, in some security systems, the cameras, sensors, or other devices communicate with an access point using wireless signals.

SUMMARY

This specification describes technologies relating to access and control of networked devices.

In general, one innovative aspect of the subject matter described in this specification can be embodied in methods that include the actions of receiving a request for access to a security system device; determining whether the device is set to a first mode or a second mode; and in response to determining that the device is in the second mode, generating one or more notifications to authorized users identifying the access to the security device. Other aspects include apparatuses, systems, and computer storage media encoding a computer program that includes instructions that can be executed by one or more computers performs operations described in the specification.

The foregoing and other embodiments can each optionally include one or more of the following features, alone or in combination. The second mode indicates one or more authorized users are present within a region covered by the security system. The first mode indicates that authorized users are not present within a region covered by the security system. Determining whether the device is set to a first mode or a second mode and generating one or more notifications is performed by firmware of the security system device. Determining whether the device is set to a first mode or a second mode and generating one or more notifications is performed by a hardware circuit of the security system device. The security system device is an internet protocol (IP) device. The IP device is an IP camera. The one or more notifications include one or more of an audible alarm or a flashing light emitted from the accessed security device. The one or more notifications include a text or push notification to a user device of one or more authorized users. The notification includes an identity of the user gaining access to the security device.

In general, one innovative aspect of the subject matter described in this specification can be embodied in methods that include the actions of receiving at a security system, one or more types of data associated with users of the security system; using the received data to determine a particular mode to set one or more security devices of the security system; setting the mode of one or more security devices based on the determination; receiving a request to access a first security device of the security system; and determining whether to provide a notification based on the mode set for the first security device. Other aspects include apparatuses, systems, and computer storage media encoding a computer program that includes instructions that can be executed by one or more computers performs operations described in the specification.

The foregoing and other embodiments can each optionally include one or more of the following features, alone or in combination. One of the one or more types of data is location data for one or more authorized users. The determining the particular mode includes determining the location of each authorized user and wherein a first mode is set when users are located within a region covered by the security system and a second mode is set when users are not located within the region covered by the security system. One of the one or more types of data is sensor data for one or more sensors of the security system. The determining the particular mode includes determining whether sensor data indicates that users are located within a region covered by the security system and wherein a wherein a first mode is set when users are located within a region covered by the security system and a second mode is set when users are not located within the region covered by the security system. One of the one or more types of data is user profile data. The determining the particular mode includes analyzing the user profiles and setting the mode based on the analysis. The analysis includes analyzing user schedules. The analysis includes analyzing user specified rules. A first rule specifies a particular security device as always being set to the first mode. Setting the mode of one or more devices includes setting the mode of all devices in the security system. Setting the mode of one or more devices includes setting the mode of a particular subset of devices of the security system.

Particular embodiments of the subject matter described in this specification can be implemented so as to realize one or more of the following advantages. Notification techniques that indicate access to security system devices such as cameras are provided to improve user privacy. Using firmware or hardware circuits in security devices to trigger notifications based on device mode reduces the likelihood that the notifications can be bypassed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
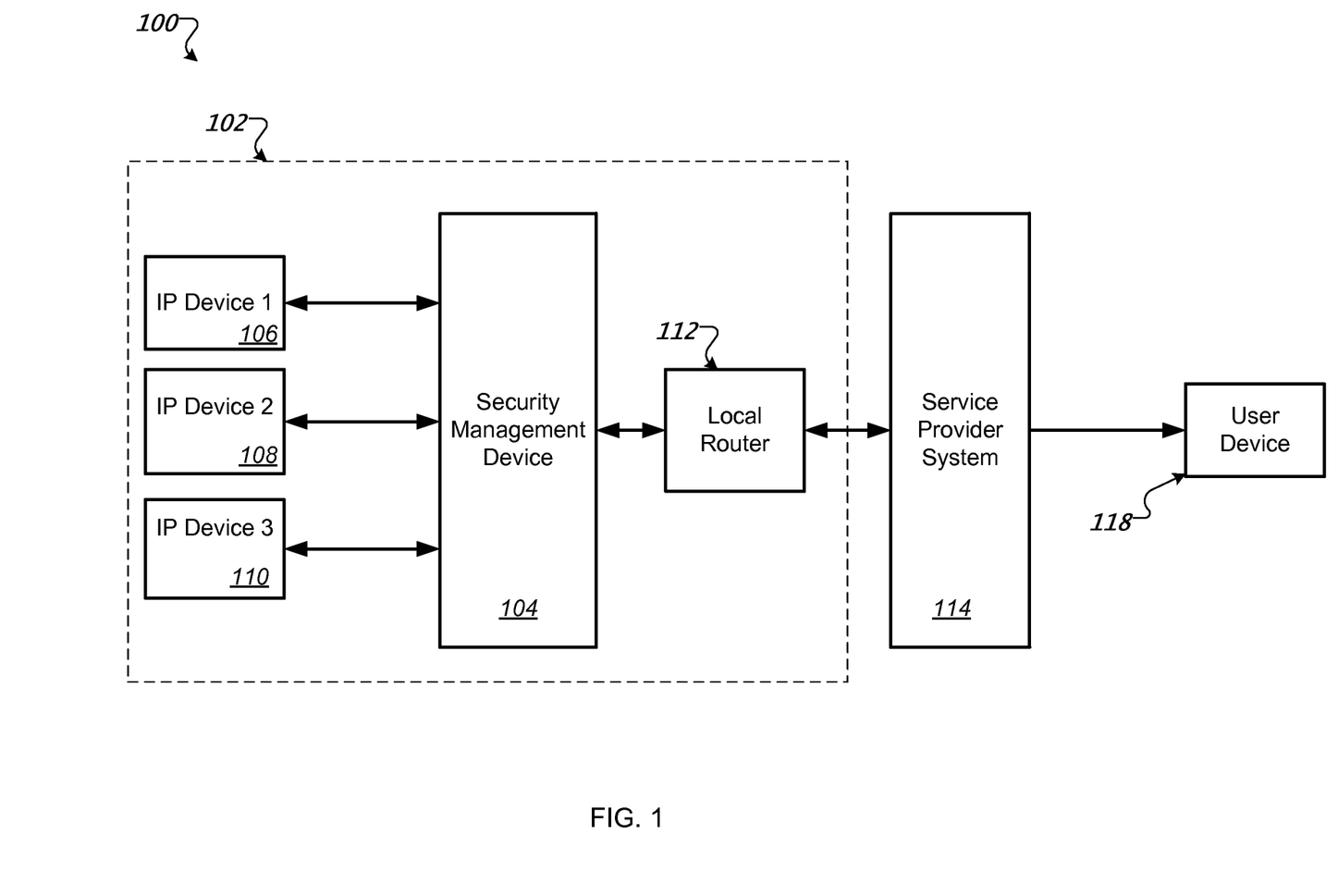
FIG. 1 is a block diagram of an example system.

FIG. 1 is a block diagram of an example system 100. The system 100 includes a local security system 102 that is communicatively coupled to a service provider system 114, e.g., through a network (not illustrated).

The local security system 102 includes a security management device 104 and wireless enabled devices 106, 108, and 110. In some implementations, the wireless enabled devices 106, 108, and 110 are communicatively coupled to the security management device 104 through a secure wireless network.

The wireless enabled devices 106, 108, and 110 can include different Internet Protocol (IP) devices such as IP cameras as well as wireless sensors and other devices. For example, in a typical home security system, several strategically positioned cameras and sensors may be included. In addition to sensors included for security purposes such as movement and displacement sensors, for example, detecting the opening of doors and windows, other sensors providing other useful information may be included such as doorbell sensors, smoke detector alarm sensors, temperature sensors, and/or environmental control sensors and/or controls. Additionally, the wireless enabled devices can include actuator devices. The actuator devices can include for example a door actuator that allows for remote locking and unlocking of an associated door, window, or other latched structure.

Video data captured by an IP camera (e.g., video, a video clip, or one or more still images generated from video), can be wirelessly transmitted to the security management device 104 for transmission to the service provider system 114. The security management device 104 can also include an RF transmitter/receiver configured to receive alerts or other communications from the respective sensors, cameras, and other devices. The RF transmitter/receiver can use any suitable RF wireless protocol, in particular those used in home security and automation including, for example, 433 MHz, 426 MHz, 868 MHz, Zwave, Zigbee, WiFi, etc.

The security management device 104 can be an access point device. The security management device 104 can be used to manage the wireless enabled devices 106, 108 and 110, for example, to establish the secure wireless network and to communicate with the service provider system 114. For example, the security management device 104 can send event notifications, e.g., in response to a triggered sensor, to the service provider system 114 which provides the event notifications to one or more users of the local security system 102, e.g., to user device 118. Similarly, the security management device 104 can receive commands from the service provider system 114, e.g., to provide video data to a particular authorized user of the local security system 102 in response to a request or to activate a particular device of the local security system 102 such as an actuator device, as will be described in greater detail below.

The security management device 104 is communicatively coupled to the service provider system 114, e.g., using a modem or directly to the Internet through an ISP, through a local router 112. In some implementations, the local router 112 can be coupled to one or more modes of communication. For example, a broadband connection mode such as cable or Ethernet, a PSTN telephone connection mode, or a cellular connection mode. In some alternative implementations, the security management device 104 includes a router such that the separate local router 112 is not included in the local security system 102.

The security management device 104 can also act as a gatekeeper that provides a single avenue for communication with the service provider system 114. In particular, instead of allowing the wireless enabled devices to communicate directly with the service provider system 114, e.g., using a 3G dongle, only local communications within the security system, e.g., to the security management device 104, are permitted. This reduces the number of connections between various security systems and the service provider system 114. The security management device 104 can periodically communicate with the wireless enabled devices 106, 108, and 110, for example, to confirm active status. If there is a problem one of the wireless enabled devices, the security management device 104 can notify the service provider system 114 which may in turn notify one or more user devices associated with the security system, e.g., user device 118.

The service provider system 114 provides management and communication functions for the system 100. In particular, while only one local security system 102 is shown, the service provider system 114 can be used to manage multiple different local security systems associated with corresponding users. The service provider system 114 can be one or more servers or a cloud based management system. The service provider system 114 can provide authentication and registration functions for establishing a secure wireless network at the local security system 102 as well as for authenticating user control commands and requests. Furthermore the service provider system 114 can manage communication between the security management device 104 and one or more user devices 118 associated with the local security system 102.

The user device 118 represents various device types that can be used by one or more users to receive security data, e.g., alerts or video streams, and provide control instructions for the local security system 102. For example, the user devices 118 can be one of various types of smartphones that includes a security management application or a web browser for accessing a security management website.

When the user device 118 attempts to interact with the service provider system 114, its authority may be confirmed by the service provider system 114. For example, the user device 118 can provide information that uniquely identifies the requesting device, e.g., an Internet Protocol (IP) address, a product serial number, or a cell phone number. Alternatively, the user may provide a user name and password which are validated to determine authority to interact with the service provider system 114 and to access data associated with the local security system 102. To facilitate such authorization procedures, the service provider system 114 can store, or have ready access to, authorization information for each secure wireless network of users who subscribe to the service. The user device 118 can be used to receive information from the local security system 114, e.g., alarm information, as well as used to control functions of the security system, e.g., to request video data from an IP camera or to activate an actuator device (e.g., a door actuator) of the local security system 102 (e.g., as wireless enabled device 106).

Figure 2:
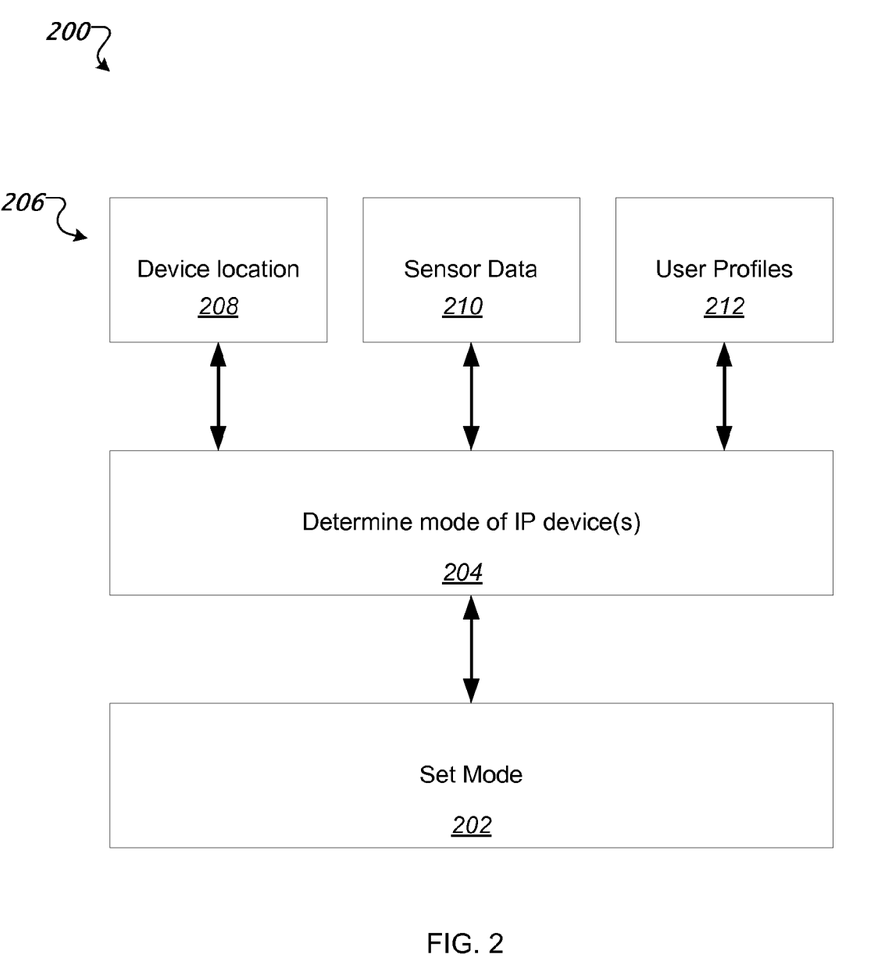
FIG. 2 is an example diagram for setting a device mode.

FIG. 2 is an example diagram 200 for setting a device mode. A security system can include one or more IP devices, e.g., one or more of the IP devices 106, 108, and 110 of FIG. 1. In particular, the IP devices will generally be referred to in this specification as being cameras, however, the techniques can be applied to other suitable IP devices in the security system. The cameras, for example, can communicate with a security management device though a wireless network of the local security system, e.g., security system 102. The communications to and from the cameras can be encrypted and identity verification can be required for individuals to access camera data.

Conventional IP devices including IP cameras may be vulnerable to unauthorized intrusions allowing device access, e.g., access to camera video or images, without permission or unwanted access to authorized individuals. To protect against access, the security devices can have a particular set mode 202, which is determined 204 based on one or more criteria 206.

In some implementations, each security device has a first mode and a second, different, mode although other modes are possible. In particular, each camera can be set in a stay mode or in an away mode. In the stay mode, the security device is configured to alert authorized users whenever the security device is being accessed. The security device can be placed in stay mode, for example, when individuals associated with the security system are present (e.g., at home). In the away mode, the security device can be accessed without notification or alert in the event of being accessed, e.g., when the individuals are not at home.

In some implementations, the security management device applies the same mode to all devices, e.g., to all cameras, in the security system. In other implementations, devices can be placed in different modes within the same security system. For example, an authorized user can specify particular cameras to be in a particular mode even if the one or more criteria for determining a different mode are satisfied. In another example, an authorized user can designate a particular camera to remain in stay mode in situations where the remaining cameras switch to away mode, e.g., when the user leaves the house. That way the authorized user(s) can remain notified if the stay mode camera is accessed. Thus, the particular mode of each of the security devices can be specifically tailored to event criteria and user preferences.

Returning to the stay mode, the notification or alert triggered by access to a security device can take one or more of a variety of forms. For example, the alert can include an audible alarm (e.g., beeping) or one or more light flashes from the accessed security device, an audible alarm from a separate device of the security system, a notification on a security application installed on the mobile device of specified authorized users, a text notification (e.g., short message service (SMS)), a push notification on the application, etc.

Information displayed in a text or application notification can include an identity of a person or persons gaining access to the security device or devices. In particular, if the person is an authorized user or other individual identified by the service provider system, e.g., an emergency contact, the person gaining access can be identified. Other information provided in the notification can include location data of the person accessing the device including one or more of physical location, IP location, or other known location, as well as the time stamp of each device access, and/or an identification of the particular security device being accessed.

In some implementations, as noted above, the devices can be manually placed in the stay or away mode. However, in some other implementations, the mode can be set 202 based on a determination made automatically according to analysis of received data 206.

The mode can be determined based at least in part on device location data 208. In particular, if a user device of a designated user (e.g., authorized users, family members) is located within a defined region, a determination can be made to place the security devices in stay mode. The defined region can be, for example, the user's home, business, or within specified monitored zones within the home or business, e.g., within certain camera coverage. In some implementations, when a user device is in communication with a home router by WiFi, the system can use this location data indicating the user is in the home to automatically set the security devices to stay mode.

The mode can also be determined based at least in part on sensor data 210. Security system sensors such as motion sensors, contact sensors, GPS, or other environmental/tracking sensors can detect individual's presence in the security system and use that data to determine which mode to set one or more security system devices, e.g., to set one or more devices to the stay mode when the data indicates the individual is in a particular region.

The mode can also be determined based at least in part on user profile data 212. Specifically, authorized users can configure user profiles that specify criteria for setting the mode for each device. The user profile can be based on a schedule or particular security system events defined by a set of rules. For example, rules can identify events such as entering a room covered by a device as a trigger for setting the stay mode. Alternatively, another rule can set the stay mode whenever the user is in the home.

Based on analysis of the received data 206, the mode for one or more devices is determined and set. For example, security cameras within the security system can be configured to operate in the set stay or away mode because the user location or profile. The system can periodically recheck the criteria to determine whether the mode set for one or more devices should be changed. Alternatively, a change defined by newly received data 206 can trigger a new determination of the mode to set for one or more devices. For example, when a user leaves the home, the change in the device location 208 can trigger the determination to change the devices to be set in away mode.

Figure 3:
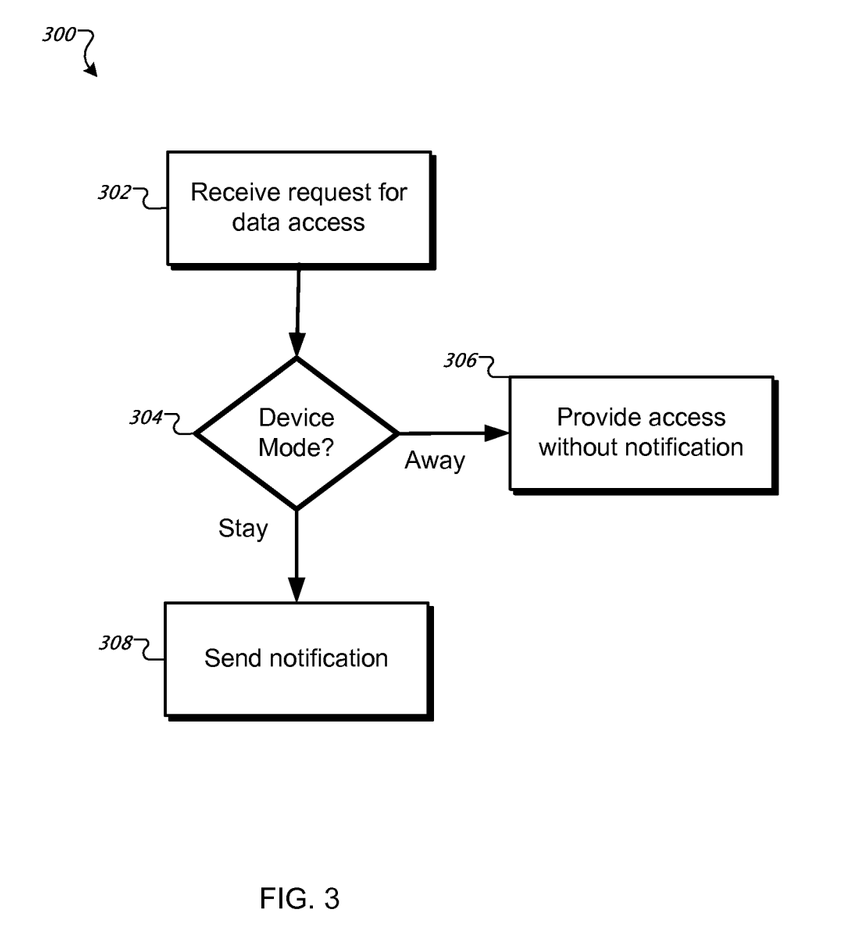
FIG. 3 is a flow diagram of an example notification method according to device mode.

FIG. 3 is a flow diagram of an example notification method 300 according to device mode. For convenience, the method is described with respect to a device e.g., a camera in a security system, that performs the method.

The device receives a request for data access (302). The data access can be, for example, access to camera data. The request can be received, for example, though a wireless network of a security system. Alternatively, the device can be communicatively wired to a security management device. The request can include, for example, a request to provide video feed or an image capture.

In response to the received request, the device determines the device mode as set to either 'stay' or 'away' (304). The mode may have been previously set, for example, based on a determination made from received data as descried above with respect to FIG. 2. If the device is set to away mode, the device provides the requested data without triggering a notification (306). However, if the device is determined to be set to stay mode, the device generates one or more notifications (308). Generating a notification can include device level notifications such as an alarm or light as well as transmitting the notification to the security management device for further processing, such as for sending text or push notifications to authorized users. The notifications can be generated before or concurrently with providing the requested data to the requestor. In some other implementations, when set to stay mode, a confirmation is required from the security management device prior to providing the requested data.

Figure 4:
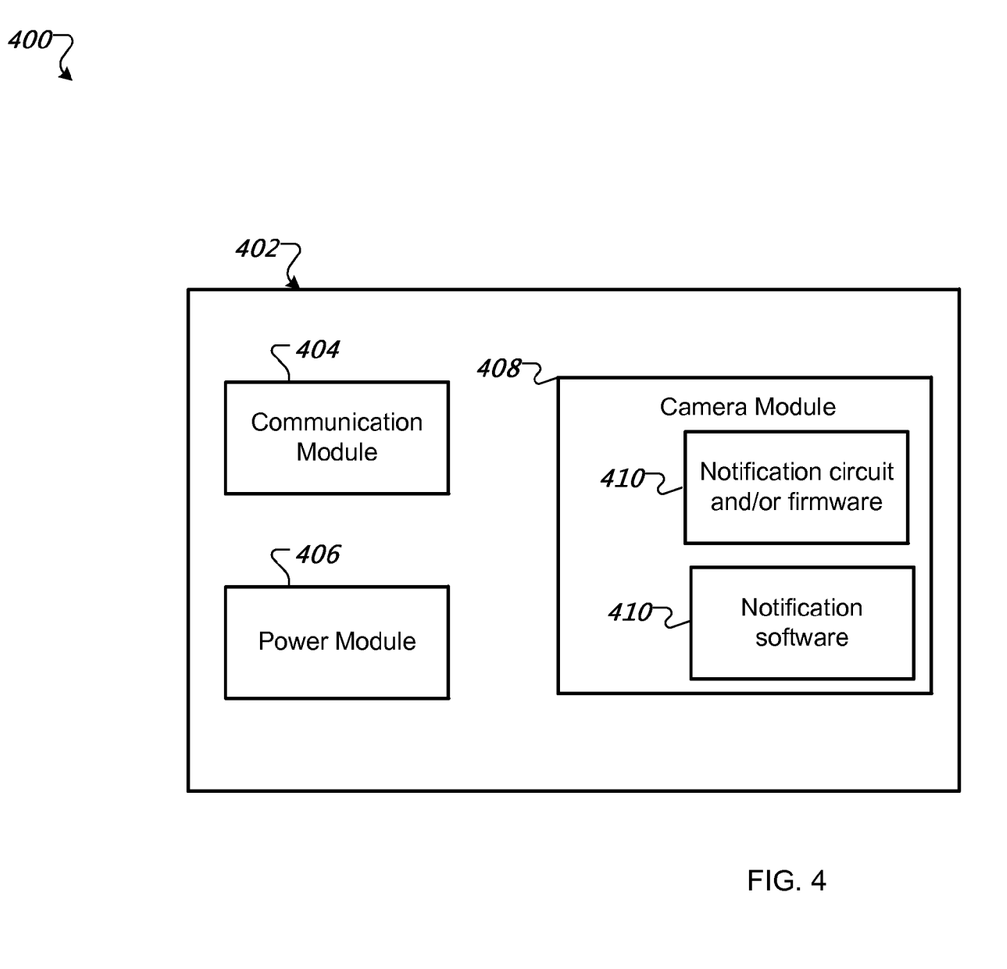
FIG. 4 is an example device configured to operate in stay and away modes.

FIG. 4 is an example device 400 configured to operate in either stay or away modes. In particular, the example device 400 is an IP camera device 402. The IP camera device 402 includes a communication module 404, a power module 406, and a camera module 408. The communication module 404 provides communication functions for the IP camera within the security system, for example, wired or wireless communication as well as establishing proper communication and authentication. In some implementations, the communication module 404 includes a WiFi transmitter/receiver.

The power module 406 provides electrical power for the IP camera device 402. In some implementations, the power module 406 includes one or more batteries for powering the IP camera device 402. In other implementations, the power module 406 includes components for managing and transforming input electrical power from a home electrical system.

The camera module 408 includes camera software that manages the camera functions of the IP camera device 402 including software and hardware for capturing video data and formatting the captured data for transmission as video or still image data. The camera module 408 can also include notification hardware or firmware 410 that triggers notification when access requests under stay mode are detected. For example, a particular hardware circuit or firmware code, which is difficult to compromise from an external source, can be built into the camera module 408 such that when the video or audio access request or camera activation occurs, a notification can be provided depending on the mode set for the IP camera device 402. While providing robust notification protection, the use of hardware or firmware may not be able to provide complex logic or dynamic profile management to determine whether or not notifications should be provided.

Alternatively, or additionally, notification software 410 on the camera module 408 can obtain user/device profile information, for example, from the security management device or the service provider system. The software can include a number of determinations that directly establish the mode for the IP camera device 402 as well as the notification trigger. For example, the software can use the profile information and the request to determine 1) whether certain functions are activated, e.g., video or audio; 2) whether the request was received from an authorized user; 3) the date/time of the request; 4) the condition of other sensors in the security system; and 5) the location or status of the authorized users of the system. The profile can be dynamically updated by various inputs locally or from the service provider system.

In some implementations access to security devices can be detected by a security management device, e.g., the security management device 104 described above with respect to FIG. 1. The security management device can use both hardware/firmware or application techniques as described above with respect to device level access detection. Additionally, the security management device can detect access based on network traffic including by port number or network protocol used. In particular, the security management device can manage all requests for access to individual security devices. Thus a requesting user does not communicate directly to the individual security devices. The security management device can set the respective modes for the individual security devices as well as determine the mode and potential notifications in response to receiving a request to access a particular device.

In some other implementations, access to security devices can be detected by a service provider system, e.g., the service provider system 114 described above with respect to FIG. 1. The service provider system can manage the user profiles described above. In particular, as a manager of user profiles, the service provider system 114 can include a database or other storage architecture that stores user/device profiles. Authorized users can change their profile(s) using a web browser interface or through an application installed on a user computing device including a mobile device. The user/device profiles can also be updated in response to a system-wide event, for example, when a major security breach has occurred. For example, a vendor that provides various IP devices, e.g., IP devices 106, 108, or a vendor associated with user devices such as user device 118 can have a security breach that requires an update to user/device profiles.

The service provider system 114 can also perform access detection. In many cases, the user device 118 will connect to the service provider system 114 first to perform authentication and authorization before it can access particular devices e.g., security management device 104 or IP devices 106, 108, 110. In this case, the service provider system 114 can send notifications to related users and devices based on the user/device profiles. The service provider system 114 can also have a built-in learning system. This system can detect regular user behavior, such as 1) when the user typically accesses security devices; 2) where the user device 118 is located based on physical location or network type; 3) which IP device the user typically accesses; and/or 4) for what duration of time the user typically accesses devices. If the user behavior does not satisfy the detected patterns of typical user behavior the security provider system 114 can issue a challenge question to user device 118 to verify the user authentication. Alternatively, or additionally, the security provider system 114 can send notification directly to related users and devices.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
  receiving, at a security system, a request for access to a security system device;
  determining whether the device is set to a first mode or a second mode; and
  in response to determining that the device is in the second mode, generating one or more notifications to autho- rized users identifying the access to the security device, wherein the device is set to a first mode or a second mode in response to:

receiving, at the security system, sensor data from one or more security system devices of the security system;

using the received data to determine a particular mode to set for the one or more of the security system devices, wherein determining the particular mode includes determining whether sensor data indicates that users are located within a region covered by the security system and wherein a first mode is set when users are located within a region covered by the security system and a second mode is set when users are not located within the region covered by the security system; and setting the mode of the one or more security devices based on the determination.

2. The method of claim 1, wherein the generating one or more notifications is performed by firmware of the security system device.

3. The method of claim 1, wherein the generating one or more notifications is performed by a hardware circuit of the security system device.

4. The method of claim 1, wherein the security system device is an internet protocol (IP) device.

5. The method of claim 4, where the IP device is an IP camera.

6. The method of claim 1, wherein the one or more notifications include one or more of an audible alarm or a flashing light emitted from the accessed security device.

7. The method of claim 1, wherein the one or more notifications include a text or push notification to a user device of one or more authorized users.

8. The method of claim 7, wherein the notification includes an identity of the user gaining access to the security device.

9. A method comprising:

receiving at a security system, one or more types of data associated with users of the security system, wherein one of the one or more types of data comprises location data for one or more authorized users;

using the received data to determine a particular mode to set one or more security devices of the security system, wherein determining the particular mode includes determining the location of each authorized user and wherein a first mode is set when users are located within a region covered by the security system and a second mode is set when users are not located within the region covered by the security system;

setting the mode of one or more security devices based on the determination;

receiving a request to access a first security device of the security system; and determining whether to provide a notification based on the mode set for the first security device.

10. The method of claim 9, wherein one of the one or more types of data further includes sensor data for one or more sensors of the security system.

11. The method of claim 10, wherein the determining the particular mode includes determining whether sensor data indicates that users are located within a region covered by the security system and wherein a first mode is set when users are located within a region covered by the security system and a second mode is set when users are not located within the region covered by the security system.

12. The method of claim 9, wherein one of the one or more types of data further includes user profile data.

13. The method of claim 12, wherein the determining the particular mode includes analyzing the user profiles and setting the mode based on the analysis.

14. The method of claim 13, wherein the analysis includes analyzing user schedules.

15. The method of claim 13, wherein the analysis includes analyzing user specified rules.

16. The method of claim 15, wherein a first rule specifies a particular security device as always being set to the first mode.

17. The method of claim 9, wherein setting the mode of one or more devices includes setting the mode of all devices in the security system.

18. The method of claim 9, wherein setting the mode of one or more devices includes setting the mode of a particular subset of devices of the security system.

19. A system comprising:

one or more computers including one or more non-transitory computer storage media storing instructions that when executed by the one or more computes are configured to perform operations comprising:

receiving, at a security system, a request for access to a security system device;

determining whether the device is set to a first mode or a second mode; and in response to determining that the device is in the second mode, generating one or more notifications to authorized users identifying the access to the security device, wherein the device is set to a first mode or a second mode in response to:

receiving, at the security system, sensor data from one or more security system devices of the security system;

using the received data to determine a particular mode to set for the one or more of the security system devices, wherein determining the particular mode includes determining whether sensor data indicates that users are located within a region covered by the security system and wherein a first mode is set when users are located within a region covered by the security system and a second mode is set when users are not located within the region covered by the security system; and setting the mode of the one or more security devices based on the determination.

20. A system comprising:

one or more computers including one or more non-transitory computer storage media storing instructions that when executed by the one or more computes are configured to perform operations comprising:

receiving at a security system, one or more types of data associated with users of the security system, wherein one of the one or more types of data comprises location data for one or more authorized users;

using the received data to determine a particular mode to set one or more security devices of the security system, wherein determining the particular mode includes determining the location of each authorized user and wherein a first mode is set when users are located within a region covered by the security system and a second mode is set when users are not located within the region covered by the security system;

setting the mode of one or more security devices based on the determination;

receiving a request to access a first security device of the security system; and determining whether to provide a notification based on the mode set for the first security device.

* * * * *